INVENTOR.
LEONARD E. AUSTIN
BY
James L. O'Brien

March 29, 1966 L. E. AUSTIN 3,242,952
FLUID DISPENSING APPARATUS
Filed Feb. 7, 1963 3 Sheets-Sheet 2
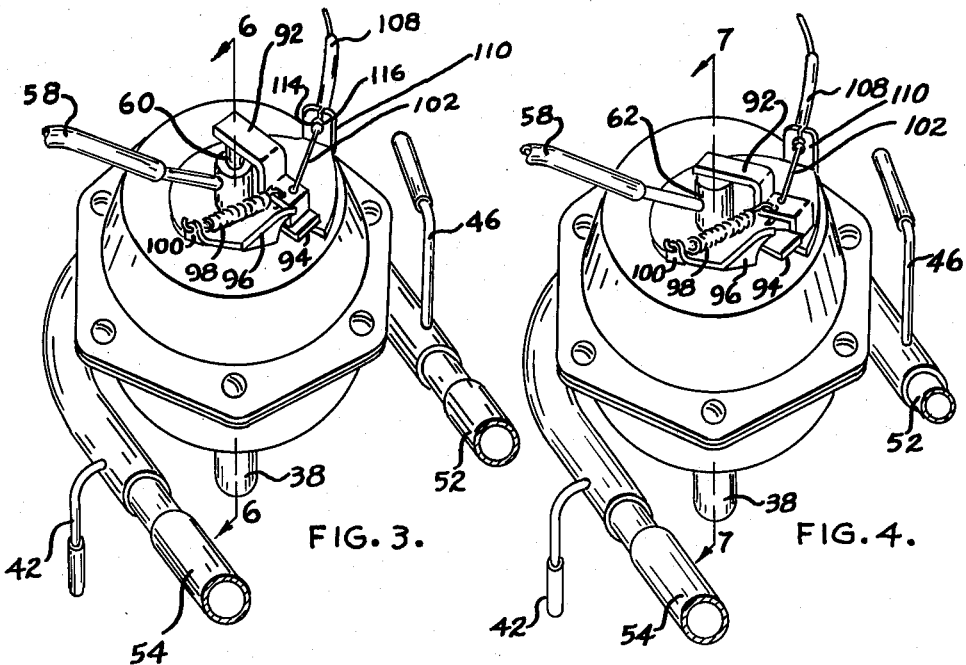
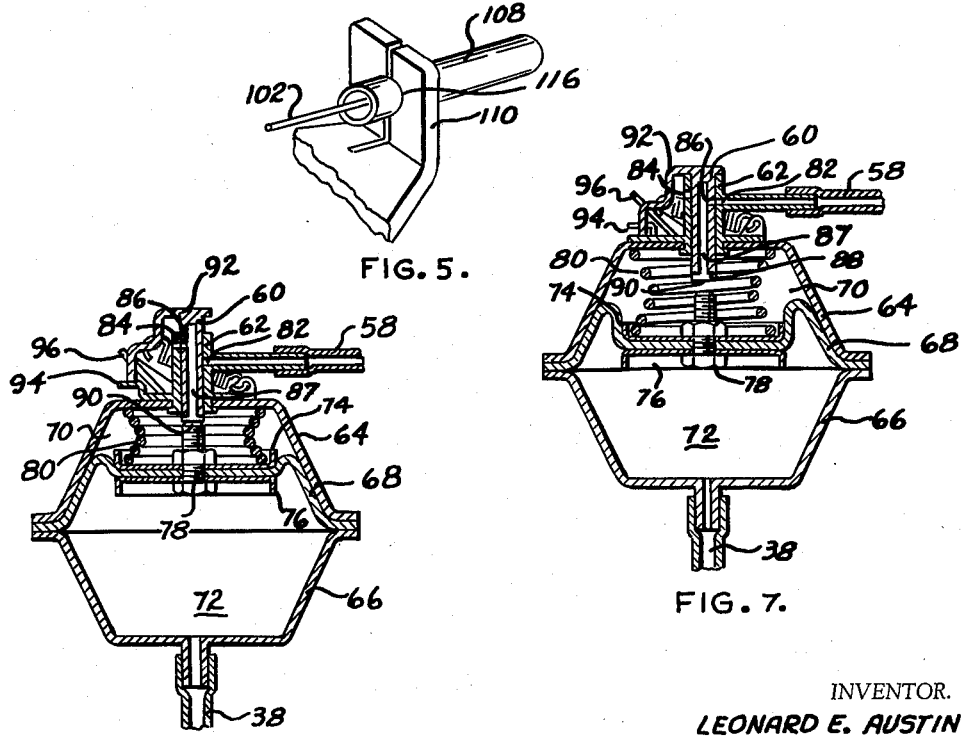
INVENTOR.
LEONARD E. AUSTIN

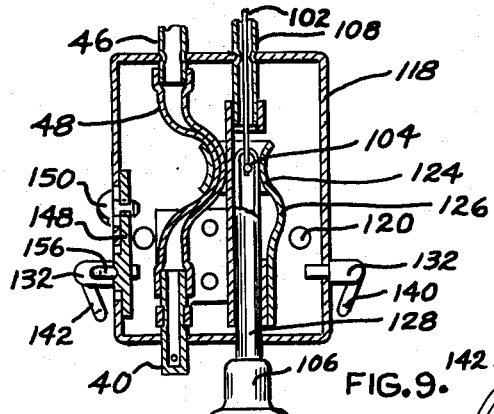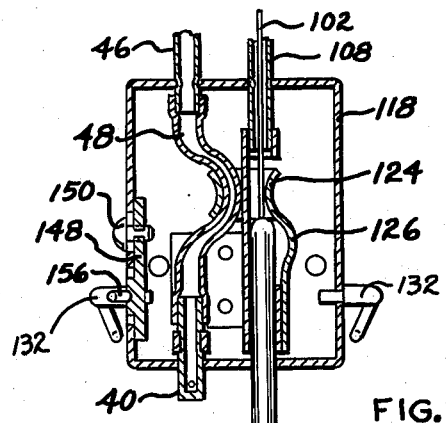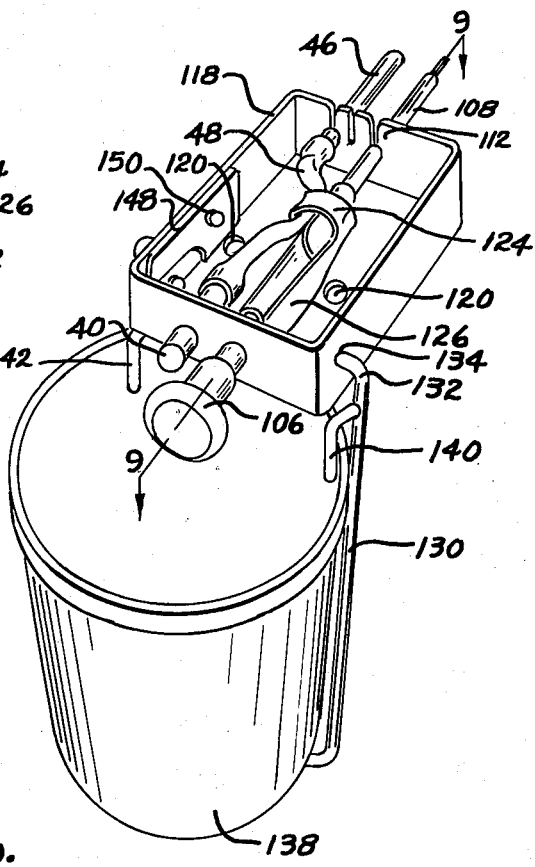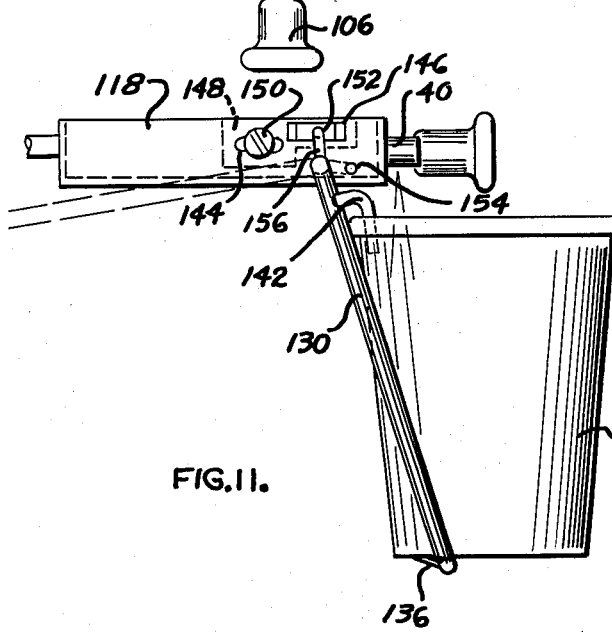

United States Patent Office 3,242,952
Patented Mar. 29, 1966

3,242,952
FLUID DISPENSING APPARATUS
Leonard E. Austin, South Bend, Ind.
(512 S. Cortez St., Prescott, Ariz. 86301)
Filed Feb. 7, 1963, Ser. No. 258,950
9 Claims. (Cl. 141—377)

The present invention relates to a fluid dispensing apparatus for use on an internal combustion engine driven vehicle and constitutes an improvement over the dispensing apparatus disclosed and claimed in my U.S. Patent No. 2,982,447, issued May 2, 1961.

In the present invention a pump actuated by suction or induction passage pressure discharges a metered quantity of fluid through a heat exchanger to a discharge nozzle located in the passenger compartment of the vehicle. The heat exchanger is wrapped around at least a portion of the pump and is located in the engine compartment for connection with the engine cooling system. A control member in the passenger compartment extends through the fire wall for connection with the pump to permit the operator to initiate pump actuation.

It is an object of the present invention to provide in a fluid dispensing pump a simple, accurate and reliable control for actuating the pump to discharge a predetermined measured quantity of fluid.

It is a further object of my invention to provide in a fluid dispensing apparatus an improved cup or receptacle holder.

It is a still further object of my invention to provide an improved actuating member and shut off valve for a fluid dispensing apparatus.

Another object of my invention is to provide an improved securing means for a connection between the actuating member and pump of a fluid dispensing apparatus.

Still another object of my invention is to provide a fluid dispensing apparatus which may be easily and inexpensively manufactured and easily installed in operative position on a motor vehicle.

Other objects and advantages of my invention will become readily apparent from the following description taken in connection with the accompanying drawing in which:

FIGURES 3 and 4 are perspective views of the pump shown in FIGURE 1 with the pump control in different operative positions;

FIGURE 5 is an enlarged, fragmentary view of the control wire sheath securing means shown in FIGURES 3 and 4;

Figure 1:
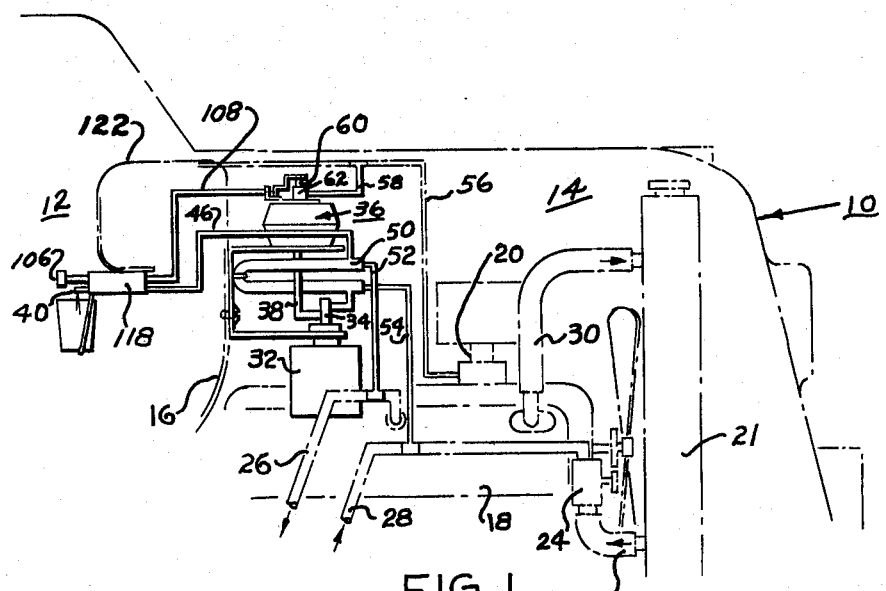
FIGURE 1 is a diagrammatic view showing an apparatus embodying the present invention installed in an automobile.
Figure 2:
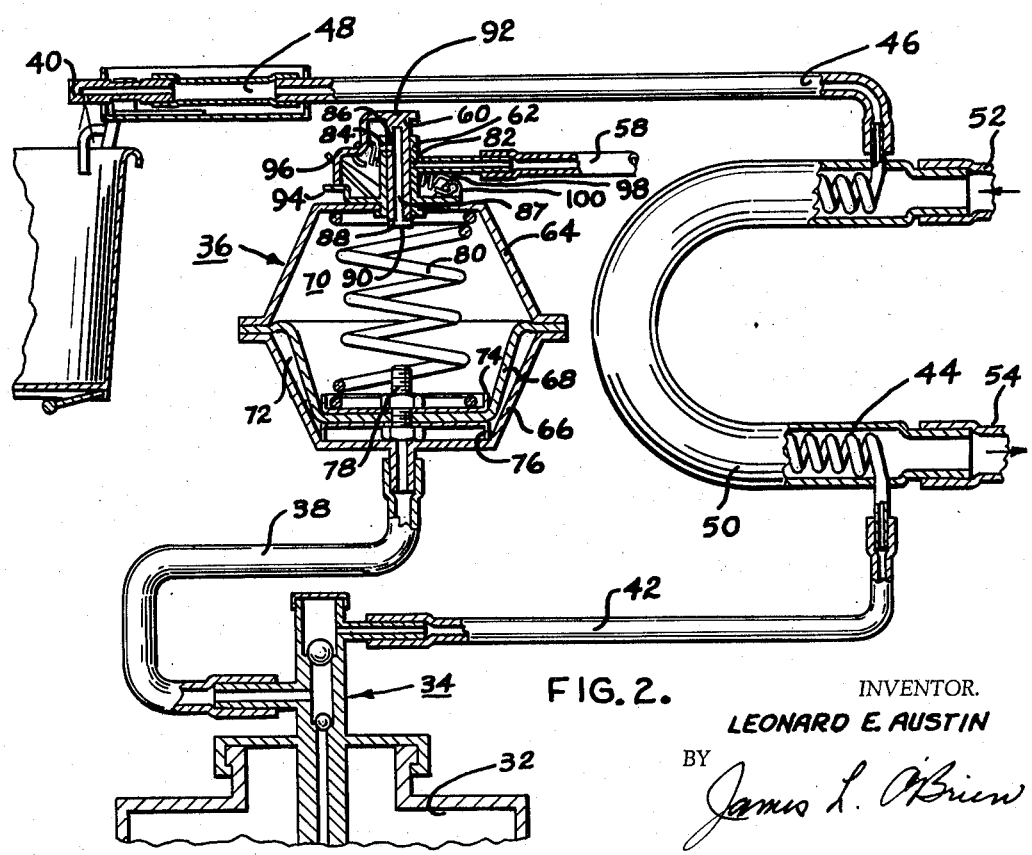
FIGURE 2 is a diagrammatic view of a portion of the apparatus shown in FIGURE 1 with some of the parts shown in section and rearranged to better show the invention.

FIGURES 6 and 7 are sectional views taken along lines 6—6 and 7—7 of FIGURES 6 and 7 respectively;

FIGURE 8 is a perspective view of the cup holder and actuating member shown in FIGURE 1;

FIGURES 9 and 10 are top views of FIGURE 8 showing various operative positions; and FIGURE 11 is a view of the left side of FIGURE 8.

Referring now to the drawings and more particularly to FIGURE 1, numeral 10 designates a motor vehicle, 12 a passenger compartment and 14 an engine compartment separated from said passenger compartment by a fire wall 16. An internal combustion engine 18 having an induction passage 20 is mounted in compartment 14. A radiator 21 is connected to the engine through outlet pipe 22 and pump 24. Hot water from the engine block is transmitted through heater hose 26 to a heater (not shown) and returned via hose 28 and engine return pipe 30 to the radiator. Mounted in compartment 14 is a source of fluid or water bag 32 which is connected through a check valve device 34 to a fluid dispensing pump 36 by a conduit 38. Pump 36 is connected to a point of discharge or nozzle 40 by means of conduit 38, check valve device 34, conduit 42, coil 44, passage 46 and flexible tube 48. Coil 44 is disposed within a heat exchanger 50 which is connected to heater hoses 26 and 28 by means of conduits 52 and 54 respectively. Coil 44 and heat exchanger 50 are arranged in counter flow relation, i.e., the hot liquid flows through the heat exchanger 50 in a direction opposite to the direction of flow through the coil 44.

Pump 36 is connected to the induction passage 20 by means of a conduit 56 and branch passage 58. Conduit 56 is also adapted for connection with a windshield wiper vacuum motor (not shown). The connection between passage 58 and pump 36 is controlled by a hollow cylindrical valve 60 which is axially and rotatably mounted in a cylinder 62 which opens at one end into the interior of the pump.

Pump 36 is provided with housing halves 64 and 66 which marginally clamp diaphragm or movable wall 68 in position to divide the interior of the pump into chambers 70 and 72. Diaphragm 68 is provided with cup-shaped members 74 and 76 disposed on opposite sides of the diaphragm and centrally secured thereto by adjustable abutment member 78. A spring 80 in chamber 70 engages an end wall of housing 64 and cup-shaped member 74 to urge diaphragm 68 in a fluid discharge direction.

Conduit 58 is connected to cylinder 62 through a port 82 formed in the side wall thereof. A vent 84 is also formed in the side wall of cylinder 62 axially and circumferentially spaced from port 82. Valve 60 is provided with an orifice 86 in the side wall thereof adapted in different operative positions to register with the port 82 and vent 84. A longitudinal passage 87 in valve 60 connects orifice 86 with chamber 70. Passage 87 terminates in a transverse groove 88 formed in an end 90 of valve which is adapted for engagement with abutment 78 whereby when abutment 78 is in engagement with end 90, passage 87 remains in unrestricted communication with chamber 70 through groove 88.

An arm 92 is secured to valve 60 for engagement with axially and circumferentially spaced first and second steps 94 and 96 formed on pump housing 64. A tension spring 98 is secured at one end to arm 92 and at the other end to a lug 100 formed on housing 64. Spring 98 is arranged to urge valve 60 axially inwardly into chamber 70 and rotatably into engagement with the first stop 94. The abutment of the free end of arm 92 with the housing 64 limits the inward travel of the valve.

A pull wire 102 is secured at one end to arm 92 and is provided at the other end with a head 104 having a lost motion connection with manually actuated control member 106. Wire 102 is provided with a resilient sheath 108 such as a nylon tube. Sheath 108 is secured at its ends in split members 110 and 112 having complementary notches 114 and 116 which are adapted to mate to form a circular opening having a diameter greater than the diameter of wire 102 and smaller than the outside diameter of sheath 108.

Split member 112 is formed in a mounting base 118 which carries nozzle 40 and control member 106. Base 118 is provided with holes 120 for receiving suitable bolts (not shown) for mounting the base on the underside of the vehicle dashboard 122.

A ring or pinch member 124 resiliently mounted on an arm 126 in base 118 encircles flexible tube and is disposed to receive a rod like projection 128 on control member 106. Ring 124 has a diameter smaller than the combined diameters of flexible tube 48 and rod 128 so that when the rod is in the position shown in FIGURE 9 the ring pinches tube 48 closed to prevent flow therethrough.

A substantially U-shaped bail 130 formed to receive a cup or receptacle is provided with turned over portions 132 which are rotatably received in holes 134 in hose 118. A curved plate 136 having a suitable periphery to mate with the bead formed on the bottom of cup 138 is secured to the base of the U-shaped bail at an angle thereto as best seen in FIGURE 11. Depending fingers 140 and 142 are secured to the arms of the U-shaped bail 130 to receive the top of a cup 138. Base member 118 is slotted as at 144 and 146. An adjustable member 148 is mounted in the base 118 by a screw 150 received in slot 144. Member 148 is provided with a detent 152 which is disposed to register with slot 146. A detent 154 is formed in base member 118 in approximately the same plane as detent 152 but spaced therefrom. A resilient finger 156 is mounted on bail 130 for engagement with detents 152 and 154 to hold said bail respectively in its operative and retracted positions.

Due to the great variety of dashboard construction found in motor vehicles it is often impossible to mount base 118 in a horizontal position. By varying the adjustment of member 148 and detent 152 the bail 130 may be positioned to hold a cup substantially vertical when the base member 118 is mounted in a range of positions on either side of the horizontal.

In operation, the dispensing action is initiated by pulling the control member 106; the wire 102 rotates the arm 92 and valve 60 to the position shown in FIGURES 4 and 7. Spring 98 acts to move the valve axially inwardly to hold the arm in engagement with the housing 64 and the first step 94. In this position port 62 is in registration with orifice 86 and pump chamber 70 is brought into communication with the induction passage via passages 87, orifice 86, port 82, branch passage 58 and conduit 56. When the engine is running the induction passage pressure is lower than the pressure in chamber 72. The differential in pressures in chambers 70 and 72 moves diaphragm 68 upwardly compressing spring 80. During the upward travel of diaphragm 68 fluid is drawn into chamber 72 from source 32 via check valve device 34 and conduit 38.

When diaphragm 68 has moved upwardly a predetermined amount abutment 78 strikes valve 60 causing the valve to be moved axially outwardly. At a predetermined axial position of valve 60, arm 92 will be clear of the first step 94 and spring 98 will rotate the arm into engagement with the second step 96. When arm 92 is engaged with the second step, valve 60 is positioned to bring orifice 86 into registration with vent 84 as shown in FIGURES 3 and 6. In this position chamber 70 is in communication with substantially atmospheric pressure and the pressure differential acting on diaphragm 68 is less than the force of spring 80. Spring 80 then moves the diaphragm 68 downwardly discharging fluid from chamber 72 to nozzle 40 via conduit 38 check valve device 34, conduit 42, coil 44 and passages 46 and 48.

At the conclusion of a dispensing cycle the control member 106 may be pressed inwardly to cause pinch member 104 to close tube 48 to prevent any dribble or flow through nozzle.

As shown and described there are only two connections that pass through the fire wall 16 viz, discharge conduit 46 and the sheathed control wire 102. This construction greatly simplifies the installation of the equipment on vehicles after they have left the factory.

The pump control is simple yet reliable and accurate and involves relatively few parts all of which may be easily and inexpensively manufactured.

While only one embodiment of my invention has been shown and described it will be readily apparent to those skilled in the art that various changes, modifications and arrangements of parts may be made without departing from the spirit of the invention.

I claim:

1. A fluid dispensing device having a source of fluid and a source of suction comprising: a housing, a movable wall in said housing dividing the interior thereof into first and second chambers, a cylinder opening into said first chamber, a port in the side wall of said cylinder, a conduit adapted to connect said port with said source of suction, a vent in the side wall of said cylinder axially and circumferentially spaced from said port, a hollow valve mounted in said cylinder adapted for engagement with said movable wall, an orifice in the side wall of said valve, a passage in said valve adapted to connect said orifice with said first chamber, an abutment formed on said housing having first and second steps an arm on said valve adapted to engage said abutment, a spring urging said arm into engagement with said abutment, means for positioning said arm in engagement with said first step whereby said orifice is in registration with said port, said spring and movable wall acting conjointly to move said arm into engagement with said second step whereby said orifice is in registration with said vent, resilient means urging said movable wall in one direction, said movable wall being movable in response to suction in a direction opposite said one direction, an inlet and an outlet for said second chamber, and means connecting said inlet with said source of fluid.

2. A fluid dispensing device having a source of fluid and a source of suction comprising: a housing, a movable wall in said housing dividing the interior thereof into first and second chambers, a cylinder opening into said chamber, a port in the side wall of said cylinder, a conduit adapted to connect said port with said source of suction, a vent in the side wall of said cylinder axially and circumferentially spaced from said port, a hollow valve mounted in said cylinder adapted for engagement with said movable wall, an orifice in the side wall of said valve, a passage in said valve adapted to connect said orifice with said first chamber, an abutment on said housing being axially and circumferentially spaced, first and second steps formed thereon, a spring urging said arm axially and circumferentially into engagement with said abutment, manual means for positioning said arm in engagement with said first step whereby said orifice is in registration with said port, said spring and movable wall acting conjointly to move said arm into engagement with said second step whereby said orifice is in registration with said vent, resilient means urging said movable wall in one direction, and means connecting said second chamber with said source of fluid.

3. In an apparatus for dispensing fluid into a receptacle including, a pump, a nozzle, a conduit connecting said pump with said nozzle, and a mounting member: a bail pivotally mounted on said member, a plate formed on said bail adapted for engagement with the bottom of said receptacle, an arm formed on said bail and adapted for engagement with the top of said receptacle, spaced stop members formed on said mounting member, and a finger formed on said bail adapted to engage said stop members for determining the limit positions of said bail.

4. In a fluid dispensing apparatus for directing fluid to a receptacle and having a source of fluid, a pump, means adapted to connect said pump with said source, a nozzle, a conduit connecting said pump with said nozzle, a mounting member, the improvement comprising: a bail pivotally mounted on said member adapted to receive said receptacle, an adjustable detent on said member, a fixed detent formed in said member, and a resilient finger formed on said bail for engagement with detents to determine the limit positions of said bail.

5. A fluid dispensing device having a source of fluid and a source of vacuum comprising: a housing, a movable wall in said housing dividing the interior thereof into first and second chambers, a vent in said housing, a port in said housing axially and circumferentially spaced from said vent, means adapted to connect said port with a source of vacuum, a valve adapted to alternatively connect said vent and port with said first chamber, means for positioning said valve in a first position wherein said port is connected to said first chamber, a spring urging said valve rotationally toward a second position wherein said vent is connected to said first chamber, abutment means adapted to engage said valve for opposing said spring, said wall being movable to engage said valve and to move said valve axially to render said abutment means ineffective whereby said spring is effective to rotate said valve to said second position, and means adapted to connect said second chamber with said source of fluid.

6. A fluid dispensing device having a source of fluid and a source of suction comprising: a housing, first and second chambers in said housing, a movable wall in said housing separating said chambers, a cylinder formed on said housing and opening into said first chamber, a conduit connecting said cylinder with said source of suction, a vent in said cylinder axially and circumferentially spaced from said conduit, a valve in said cylinder movable axially and rotationally from a first position wherein said conduit is connected to said first chamber to a second position wherein said vent is connected to said first chamber, resilient means urging said valve rotationally toward said second position, said wall being movable to engage said valve and to move said valve axially to said second position, means connecting said second chamber with said source of fluid, an outlet, a conduit connecting said second chamber with said outlet, a manually operable member, a one-way connection between said member and said valve, and means operatively connected to said member for controlling the flow through said last-mentioned conduit, said member being movable in one direction to move said valve to said first position and being movable in an opposite direction to close said last-mentioned conduit.

7. In a fluid dispensing apparatus having a source of fluid and a source of suction, a suction-actuated pump having a movable wall therein, a conduit connecting said pump with said source of suction, a valve in said conduit, conduit means connecting said pump to said source of fluid, passage means connected to said pump and leading to a point of discharge, means for controlling the flow through said passage means, a manually-actuated control member operatively connected to said last-mentioned means, a one-way connection between said member and said valve, said member being movable in one direction to open said valve to activate said pump and being movable in another direction to directly actuate said last-mentioned means to close said passage means, said valve being moved to closed position in response to a predetermined movement of said wall.

8. A fluid dispensing device having a source of fluid and a source of suction comprising: a housing, first and second chambers in said housing, a movable wall in said housing separating said chambers, a cylindrical member formed on said housing and opening into said first chamber, a conduit connecting said member with said source of suction, a vent in said member axially and circumferentially spaced from said conduit, valve means in said member for connecting said conduit to said first chamber when said valve is in one position and to connect said vent to said first chamber when said valve is in a second position axially and rotationally displaced from said one position, manually actuated means having a one way connection with said valve for positioning said valve means in said one position, resilient means urging said valve means rotationally toward a position in axial alignment with said second position of said valve means, said wall being movable in response to suction into engagement with said valve means to move said valve means axially to said second position, and means for connecting said second chamber with said source of fluid.

9. In a fluid dispensing apparatus having a source of fluid and a source of suction, a suction actuable pump, means adapted to connect said pump with said source of fluid, conduit means adapted to connect said pump with said source of suction, a valve controlling the flow through said conduit means, passage means formed at least in part of flexible tubing connecting said pump to a point of discharge, a ring encircling said tubing, a rod-like control member connected to said valve and being movable axially away from said ring to actuate said valve and being movable axially in the opposite direction into said ring to wedge said ring into engagement with said tubing to thereby close said tubing and means responsive to a predetermined intake of fluid into the pump for closing said valve.

References Cited by the Examiner

UNITED STATES PATENTS

| | | | |
|---|---|---|---|
| 1,914,851 | 6/1933 | Fyfe | 251—4 |
| 2,719,019 | 9/1955 | Fungaroli | 141—377 X |
| 2,866,472 | 12/1958 | Risely | 137—353 |
| 2,881,959 | 4/1959 | Bitzer | 222—334 |
| 2,982,447 | 5/1961 | Austin | 137—353 X |
| 3,157,194 | 11/1964 | Stolte | 137—351 |

OTHER REFERENCES

Seward, H. L.: Marine Engineering, vol. II, N.Y., Society of Naval Architects and Marine Engineers, 1944.

LAVERNE D. GEIGER, *Primary Examiner.*

E. EARLS, *Assistant Examiner.*